US009985956B2

(12) United States Patent
Engert

(10) Patent No.: US 9,985,956 B2
(45) Date of Patent: May 29, 2018

(54) CLIENT AUTHENTICATION

(71) Applicant: RED HAT, INC., Raleigh, NC (US)

(72) Inventor: Kai Wolfgang Engert, Frankfurt (DE)

(73) Assignee: Red Hat, Inc., Raleigh, NC (US)

( * ) Notice: Subject to any disclaimer, the term of this patent is extended or adjusted under 35 U.S.C. 154(b) by 161 days.

(21) Appl. No.: 14/942,845

(22) Filed: Nov. 16, 2015

(65) Prior Publication Data

US 2016/0072794 A1 Mar. 10, 2016

Related U.S. Application Data

(62) Division of application No. 12/626,337, filed on Nov. 25, 2009, now Pat. No. 9,203,831.

(51) Int. Cl.
*H04L 29/06* (2006.01)
*G06F 21/00* (2013.01)

(52) U.S. Cl.
CPC ........ *H04L 63/0823* (2013.01); *H04L 63/101* (2013.01); *H04L 63/166* (2013.01); *H04L 63/20* (2013.01)

(58) Field of Classification Search
CPC ..... G06F 21/31; G06F 3/04842; H04L 63/08; H04L 63/0823
See application file for complete search history.

(56) References Cited

U.S. PATENT DOCUMENTS

| 2003/0221126 | A1* | 11/2003 | Berman | H04L 63/0823 726/14 |
| 2004/0111520 | A1* | 6/2004 | Krantz | H04L 63/08 709/229 |
| 2006/0168264 | A1* | 7/2006 | Baba | H04L 12/2809 709/230 |
| 2006/0174018 | A1 | 8/2006 | Zhu et al. | |
| 2009/0158392 | A1* | 6/2009 | Hughes | H04L 63/08 726/3 |
| 2009/0327696 | A1 | 12/2009 | Hatlelid et al. | |
| 2011/0271115 | A1* | 11/2011 | Adams | H04L 63/0823 713/176 |

OTHER PUBLICATIONS

Raskin, Aza, "Identity in the Browser," <www.azarask.in/blog/post/identity-in-the-browser-firefox/> published on Nov. 24, 2009, as downloaded on Mar. 26, 2010, 15 pages.
Story, Henry, "The Sun BabelFish Blog", <www.blogs.sun.com/bblfish/entry/identity_in_the_browser_firefox> posted on Nov. 25, 2009, as downloaded on Dec. 2, 2009, 8 pages.
Lord, Bob, et al., "Improve SSL Client-Authentication UI," Bug 396441, <bugzilla.mozilla.org/show_bug.cgi?id=396441>, reported on Sep. 17, 2007, as downloaded on Dec. 2, 2009, 8 pages.

* cited by examiner

*Primary Examiner* — Lisa Lewis
(74) *Attorney, Agent, or Firm* — Lowenstein Sandler LLP

(57) ABSTRACT

A client authentication system receives authentication requests associated with a web page in response to a client computing system requesting access to the web page. The authentication system determines whether a storage device contains configurations for the authentication requests. The authentication system configures client authentication for the client authentication requests in view of whether the storage device includes the configurations for the authentication requests. The GUI allows control to change the client authentication configuration for at least one of the authentication requests.

17 Claims, 9 Drawing Sheets

CLIENT AUTHENTICATION

CROSS-REFERENCE TO RELATED APPLICATIONS

This application is a divisional of U.S. patent application Ser. No. 12/626,337, filed on Nov. 25, 2009, and is hereby incorporated by reference.

TECHNICAL FIELD

Embodiments of the present invention relate to authentication. Specifically, the embodiments of the present invention relate to a method and system for improved SSL client authentication.

BACKGROUND OF RELATED ART

Secure Sockets Layer (SSL) is a protocol that provides security for communications over networks such as the Internet. In SSL, sessions are used to describe an ongoing relationship between a server and a client. Sessions are created, or rejoined, as part of the SSL handshaking protocol. During an SSL handshake, a server can request authentication from a client to ensure that the content of the server is accessed by an authorized user. Some servers require successful client authentication; otherwise a SSL connection can be terminated. Some servers request, but do not require successful client authentication and can exchange data with a client.

A client can respond to an authentication request with a 'no certificate' message or a digital certificate issued by a Certificate Authority. The server can determine whether the client certificate is valid and whether it is signed by a Certificate Authority which the server trusts. Once the SSL handshake is completed and client authentication has been successfully established, access restricted content can flow encrypted across that SSL session between the client and the server. I client authentication was not required by a server and a certificate was not submitted by a client or a certificate was not valid, unrestricted data can be exchanged between the client and the server.

Typically, when a server requests authentication from a client, a browser on the client prompts the user for a certificate. Today's popular Internet clients provide only minimal support for a user in selecting a certificate, either a 'once-per-session prompt,' an 'ask-every-time prompt,' or an 'automatically select' configuration. Each can be inconvenient and insufficient because a user may desire to change the certificate used for a session, or the set of available certificates may change during a session.

Client applications that are configured to ask-every-time can search for a user's certificates and prompt the user to select a certificate, even if the user has only one certificate. If the application does not find a certificate that meets a server's criteria, for example, there is not a certificate issued by a Certificate Authority that is trusted by the server, the client application can send a 'no certificate' message to the server. Similarly, client applications that are configured to automatically select a certificate can determine if the user has a certificate that meets the server's requirements. If the application does not find a certificate that meets a server's criteria, the application sends a 'no certificate' message to the server. Other client applications may be configured for a once-per-session prompt. Such applications prompt a user for a certificate selection and remember which certificate a user has selected for client authentication for a particular website. A user does not have to select a client authentication certificate again if the user revisits the website during the same session. The applications, however, prompt a user for a certificate selection even if the user does not have any certificates. In such a case, these applications prompt the user to select a certificate from an empty dialog box.

Prompting a user to select a certificate, even if a user does not have any certificates, can continually inconvenience a user. In addition, a user may decide to change the client authentication for a session, but does not have any means to implement authentication configuration changes. For example, a server may request, but not require client authentication, and a user may decide to not submit a certificate or may mistakenly select an invalid certificate. The result is an unauthenticated session between a client and a server where unrestricted data may get exchanged during the session. During the session, the user may decide to use client authentication. However, once the client authentication for a session has been configured, applications do not provide a user with any mechanism to change the configuration without disrupting a session. Applications today, instead, may require the user to close all open application windows and open a new application window, or require the user to manually clear the application's SSL certificate cache.

Moreover, applications today display an icon to show that a server has been authenticated. For example, a browser can display a security icon (such as "closed padlock"). However, applications do not provide any visual feedback to indicate whether or not client authentication is being used for a session.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

DETAILED DESCRIPTION

Embodiments of the invention are directed to a method and system for automatically configuring client authentication, allowing a user to change the client authentication configuration, and providing visual feedback of the client authentication configuration. An authentication system receives an authentication request from a server for a session between the server and a client. The authentication system determines whether a storage device contains a configuration that corresponds to the authentication request. The authentication system configures client authentication based on whether the storage device contains the corresponding configuration and displays a status indicator in a graphical user interface (GUI) to show the client authentication configuration for the session. The GUI allows a user to change the client authentication configuration for the session.

Embodiments of the present invention store client authentication configuration data to automatically configure client authentication without prompting a user, for example, for a certificate selection. Embodiments of the present invention can also display a GUI to provide visual feedback that indicates whether or not client authentication is being used for a session. The GUI can further provide a user control to change the client authentication configuration during a session. For example, a user can use the GUI to change the certificate being used for authentication or to change the configuration to not use client authentication at all.

Figure 1:
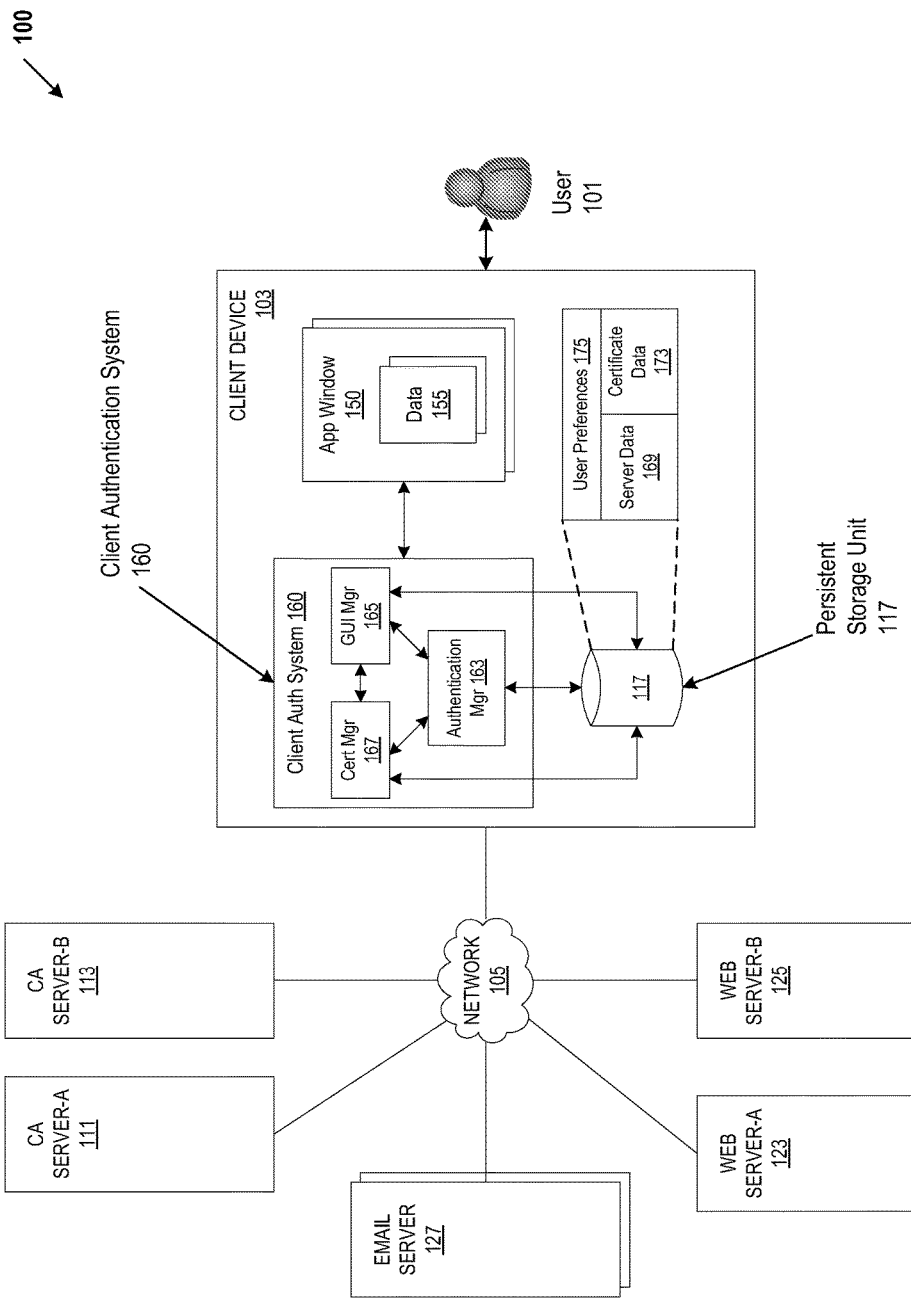
FIG. 1 illustrates an exemplary network architecture in which embodiments of the present invention may operate.

FIG. 1 illustrates an exemplary network architecture 100 on which embodiments of the present invention can be implemented. A client device 103 for a user 101 is coupled to a network 105. A client device 103 can be a smart handheld device or any type of computing device including desktop computers, laptop computers, mobile communications devices, cell phones, smart phones, hand-held computers or similar computing device capable of transmitting certificate requests and receiving certificates. The network 105 can be a wide area network (WAN), such as the Internet, a local area network (LAN), such as an intranet within a company, a wireless network, a mobile communications network, or a similar communication system. The network 105 can include any number of networking and computing devices such as wired and wireless devices.

The network architecture 100 can include one or more Certificate Authority (CA) servers 111,113 to provide authentication certificates to a user 101. The network architecture 100 can also include one or more email servers 127 to process mail requests for a user 101, and one or more web servers 123,125 to provide web pages or components of web pages to a user 101. A CA server, email server, and web server can be any type of computing device including server computers, desktop computers, laptop computers, hand-held computers, or similar computing device.

A user 101 can use a client device 103 to access data 155, such as web page content or email content, using a general purpose browser or a specialized application. Data 155 can be hosted by a server, such as a web server 123,125 or email server 127. The client device 103 can send a request over network 105 to a server 123-127 for access to the data 155. The data 155 can be displayed in an application window 150 (e.g., web browser window, email application window, etc.).

A server 123-127 can request authentication from a user 101 to establish an authenticated session with the client 103 before allowing the client device 103 access to the data 155.

'User authentication' and 'client authentication,' as used herein, refers to verifying the identity of a user through the use of a digital certificate (certificate, user certificate). A client device 103 can include a client authentication system 160 for providing a user control to change a client authentication configuration for a session and for providing visual feedback of the client authentication configuration for the session. The authentication system 160 can include an authentication manager 163, a graphical user interface (GUI) manager 165, and a certificate manager 167. This division of functionality is presented by way of example for sake of clarity. One skilled in the art would understand that the functionality described could be combined into a monolithic component or sub-divided into any combination of components.

The authentication manager 163 can maintain client authentication configuration data in a persistent storage unit 117. The authentication configuration data can include user preference 175 data. Examples of user preference 175 data include data that indicates whether a user prefers to also use expired certificates for configuring authentication. A persistent storage unit 117 can be a local storage unit or a remote storage unit. Persistent storage units can be a magnetic storage unit, optical storage unit, solid state storage unit or similar storage unit. Persistent storage units can be a monolithic device or a distributed set of devices. A 'set,' as used herein, refers to any positive whole number of items.

The authentication configuration data can also include server data 169 and corresponding certificate data 173. The authentication manager 163 can obtain server data 169 from each authentication request received from a server 123-127 and create a configuration entry in the persistent storage unit 117 for each request. Each entry can represent a configuration for authentication that is used to respond to a request from a server 123-125. Server data 169 can include, for example, the host name of the server sending an authentication request, the port number used by the server to send the request, a connection type, and a list of certificate authorities that are trusted by the server. A list of trusted certificate authorities can define the certificate authorities that a server may only accept certificates from. For example, web server-A 123 may only accept certificates that are issued by a certificate authority for the U.S. Government (e.g., CA server-A 111).

A connection type indicates whether a connection between a server 123-127 and a client 103 is associated with an application window 150 (e.g., browser window) or whether the connection is a background connection that is not associated with a particular application window. For example, a background connection can be a client application, such as a bookmark extension application, running in the background to synchronize the bookmark contents with web server-A 123. The bookmark extension application may require an authenticated session with web server-A 123. The authentication manager 163 can identify from an authentication request whether the connection is associated with a background connection or with a particular application window.

Certificate data 173 can include, for example, data indicating that a certificate was not used to respond to a request or a distinct identifier of a certificate that was used to respond to a request, data indicating where a certificate is stored (e.g., stored on a smart card), the name of the CA server that issued the certificate, the expiration date of the certificate, etc.

The authentication manager 163 can automatically configure client authentication for each session using the data stored in the persistent storage unit 117. The authentication manager 163 can determine for each authentication request whether or not there is a configuration stored in memory that corresponds to the authentication request. The authentication manager 163 can obtain the host name of the server and port number from the request, search the configuration data for an entry that has a matching host name and port number, and automatically configure authentication based on the certificate data 173 corresponding to the matching host name and port number. In cases where there is not a configuration stored in memory for an authentication request, and client authentication is not required by a server, the authentication manager 163 can automatically configure the client as an anonymous user and the session can continue as an unauthenticated session. For example, the authentication manager 163 can respond to a server with a 'no certificate' message.

The graphical user interface (GUI) manager 165 can generate a GUI to provide a user control over the client authentication configuration and with visual feedback of the configuration used for each session. Examples of elements generated and displayed by the GUI manager 165 include a status indicator to show whether or not authentication is being used for a session with a server, a list to show each server and port number requesting authentication, and a control mechanism to allow a user to change the authentication configuration for a session with a server. The GUI elements can be icons, pop-up windows, dialog boxes, selection menus, etc. The GUI manager 165 can determine the status of a session from temporary data created by the authentication manager 163 or from data stored in the persistent storage unit 117. The GUI manager 165 can display visual feedback for the authentication configuration in the application window that is associated with the authentication request. The GUI manager 165 can display visual feedback for a background connection in any currently-active application window.

The GUI manager 165 can also generate and display a client authentication control interface, an example of which is described in greater detail below in conjunction with FIG. 5, to provide a user with control to change an authentication configuration. The GUI manager 165 can display a list of certificates in the control interface based on the server's certificate requirements (e.g., list of trusted CAs). The list of certificates can include the user's certificates that are issued by CAs that are trusted by the server. The GUI manager 165 can generate a list of the certificates by searching the persistent storage unit 117 for certificates that meet a server's certificate requirements.

The certificate manager 167 can monitor the validity and/or availability of each certificate that is being used for authentication. The GUI manager 165 can display information in a GUI indicating whether a certificate is valid and/or available. For example, the certificate manager 167 can determine whether a locally stored certificate has expired. In another example, a user 101 may store a certificate on a smart card and couple the smart card to a client device 103 to authenticate the client 103 with a server 123-127. The certificate manager 167 can detect if a smart card is inserted or removed from the client device 103. The certificate manager 167 can monitor system events for events pertaining to portable storage devices (e.g., smart cards). For example, a user can insert or remove a smart card from a smart card reader in the client device and the certificate manager 167 can receive an insertion event or a removal event accordingly. The certificate manager 167 can cause a logout event for an active SSL session in response to receiving a removal event. In another example, the certificate manager 167 can determine whether a user has deleted a certificate from a client device 103 or has changed the location of a certificate in a client device 103.

The authentication manager 163, the graphical user interface (GUI) manager 165, and the certificate manager 167 can be implemented as hardware, computer-implemented software, firmware or a combination thereof. In one embodiment, the authentication manager 163, the graphical user interface (GUI) manager 165, and the certificate manager 167 comprise instructions stored in memory 804 that cause a processing device 802 in FIG. 8 described in greater detail below to perform the functions of the authentication manager 163, the graphical user interface (GUI) manager 165, and the certificate manager 167.

Figure 2A:
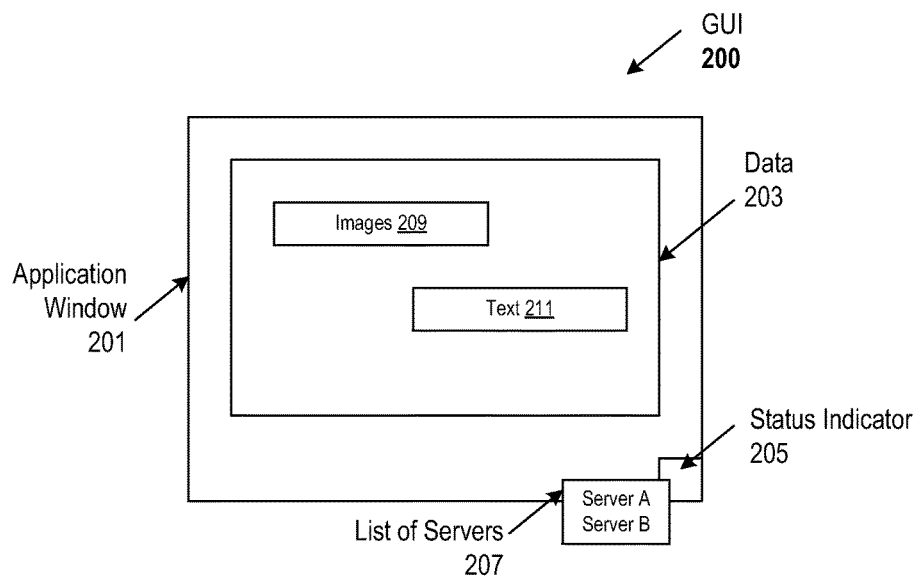
FIGS. 2A-2B illustrates an exemplary graphical user interface (GUI) and components of the GUI to control client authentication and to provide visual feedback of client authentication, in accordance with one embodiment of the invention.

FIG. 2A illustrates an exemplary GUI 200 and components of the GUI 200 to control client authentication and to provide visual feedback of client authentication, in accordance with one embodiment of the invention. GUI 200 can include an application window 201 and data 203. GUI 200 can include more than one application window 201. Data 203 may be, for example, a web page that a client requests access to.

GUI 200 can include a status indicator 205 to indicate whether or not client authentication is being used for the session. In one embodiment, the GUI 200 does not include a status indicator until the client authentication system receives an authentication request from a server. When the authentication system receives a request, the GUI 200 can display a status indicator 205 to show that client authentication is not being used, a status indicator to show that client authentication is being used, or both. The status indicator can be an icon or some other visual indicator (e.g., text box, image, etc.) to indicate whether or not client authentication is being used.

A client can receive more than one request for client authentication. A client can receive a request from more than one server. For example, data 203 can comprise data from one or more servers, such as web page text 211 hosted by a web server-A and web page images 209 hosted by web server-B. A client, therefore, can obtain data 203 by establishing a session with each server. Each server may or may not request or require client authentication. A client can also receive multiple authentication requests from the same server, but each request is made using a different port on the server. A server can communicate over a network using different protocols. For example, a mail server offers multiple services, such as a service to retrieve mail and a service to send mail. The services are separated by port number. A mail server can retrieve mail using, for example, port 993 or port 995. A mail server can send mail, using, for example, Simple Mail Transfer Protocol (SMTP), port 25.

When a client receives more than one authentication request, the GUI 200 can include a status indicator 205 to show that client authentication is successfully established for both of the servers or that client authentication is not successfully established for both of the servers. For example, the GUI 200 can include a status indicator 205 that shows authentication is not being used and a list of servers 207 where authentication is not being used. A user can select the status indicator 205 to display a list of servers 207. For example, the list 207 can be a pop-up list showing web server-A and web server-B. The list 207 can also display the server host name and port number, if there are multiple requests from the same server, but from different ports.

The status indicator 205 and the list of servers 207 can trigger the GUI to display a client authentication control interface, which is described in greater detail below in conjunction with FIG. 5. For example, a user can select a server in the list 207 or the status indicator 205 with a mouse. The client authentication control interface allows a user to select a certificate to establish an authenticated session with the server, select a different certificate for authentication, or to select that client authentication not be used for the session.

Figure 2B:
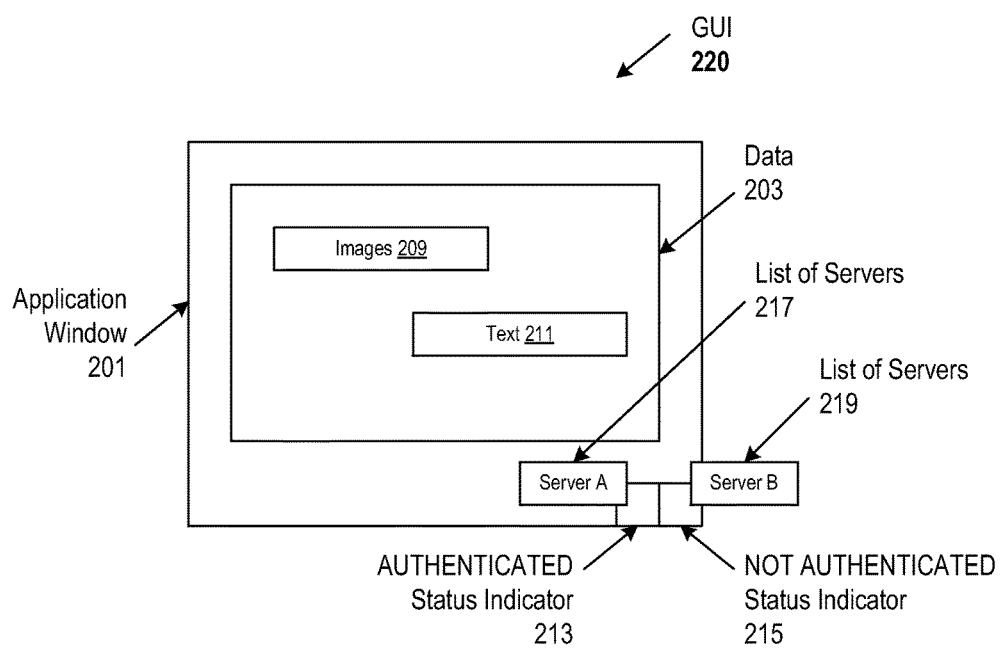

The GUI 220 in FIG. 2B includes two status indicators 213,215. There is a status indicator 213 that shows that client authentication is being used and there is a status indicator 215 that shows that client authentication is not being used. For example, a user has successfully established client authentication with web server-A. When a user selects the status indicator 213 which shows that client authentication is being used, the GUI 220 can include a pop-up list 217 that lists web server-A. When a user selects the status indicator 215 which shows that client authentication is not being used, the GUI 200 can include a pop-up list 219 that lists web server-B. When a user clicks web server-B in pop-up list 219, the GUI can display a client authentication control interface (not shown). The user can use the control interface to configure client authentication for web server-B. When a user has successfully established client authentication with web server-B, the GUI 220 can include one status indicator 205 as illustrated in FIG. 2A to show that client authentication is being used for both web server-A and web server-B.

Figure 3:
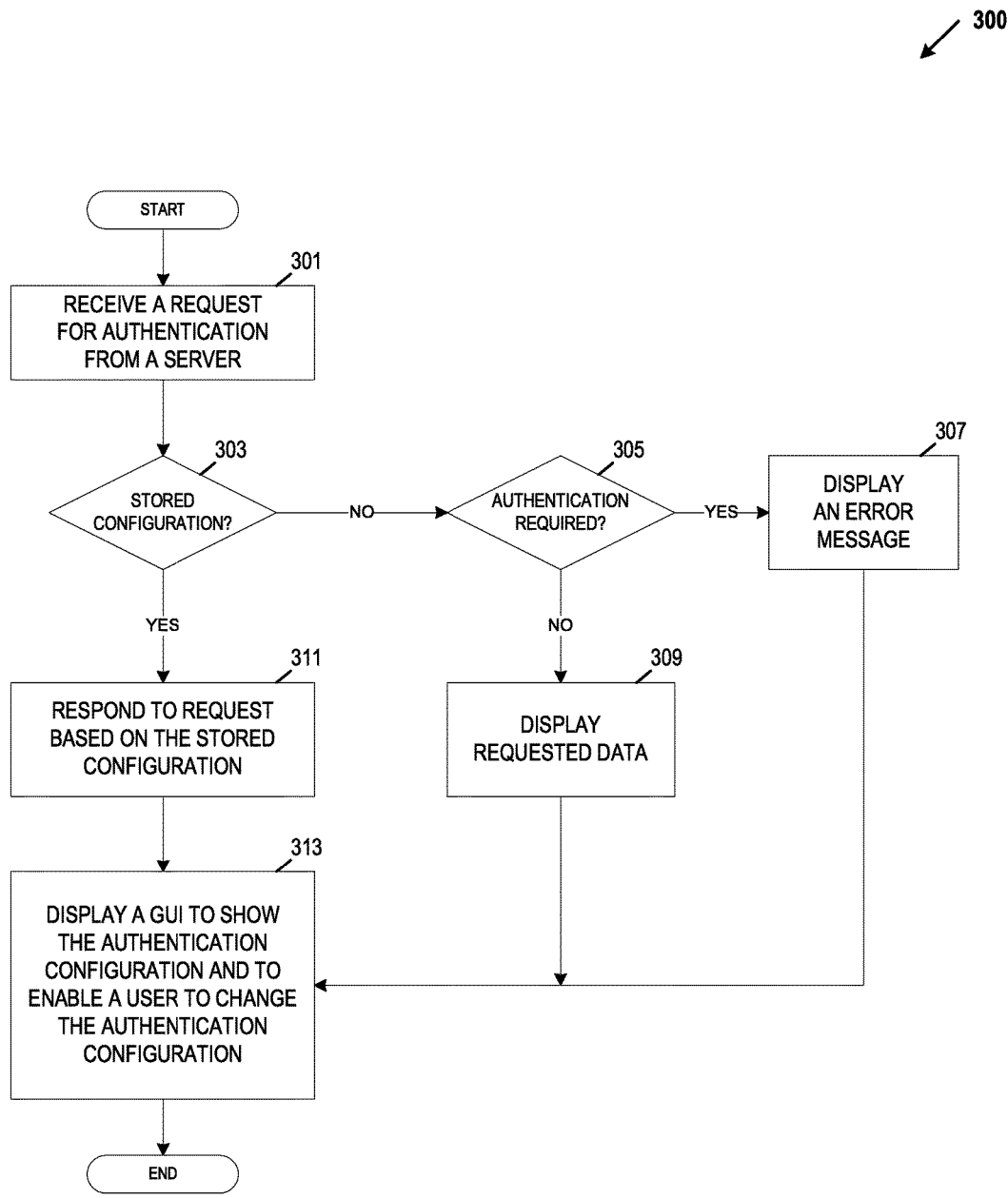
FIG. 3 is a flow diagram which illustrates an embodiment of a method for providing a user control to change a client authentication configuration and for providing visual feedback of the client authentication configuration.

FIG. 3 is a flow diagram which illustrates an embodiment of a method 300 for providing a user control to change a client authentication configuration and for providing visual feedback of the client authentication configuration. Method 300 can be performed by processing logic that can comprise hardware (e.g., circuitry, dedicated logic, programmable logic, microcode, etc.), software (e.g., instructions run on a processing device), or a combination thereof. In one embodiment, method 300 is performed by the client authentication system 160 in a client machine 103 of FIG. 1.

In one embodiment, the method 300 can be initiated upon a client requesting access to data hosted by one or more servers and the client receiving a request for authentication from a server at block 301. A request can include the host name of the server, the port number used by the server to send the request, a list of trusted CAs, and a connection type for the request.

At block 303, the client authentication system determines whether there is a configuration stored in memory that corresponds to the authentication request. The client authentication system maintains client authentication configuration data in a persistent storage unit. The client authentication system can identify the server host name and port number in the request and can search the configuration data for an entry that has a matching server host name and port number. If the client authentication system determines that there is not a configuration stored in memory that matches the server name and port number in the request (block 303), then the client continues without using authentication and the server decides whether it requires client authentication for the session at block 305.

Some servers may require that a client successfully authenticate itself with an acceptable certificate, otherwise the SSL connection between the server and the client can be terminated. Some servers may alternatively be configured to request, but not require, a client certificate, and thus, allow the SSL connection to continue as an unauthenticated session even if a client does not have a certificate or does not have a valid certificate. If client authentication is required by the server (block 305), a GUI displays an error message at block 307, and the data the client is requesting access to is not displayed. The method continues to block 313 where the GUI shows the authentication configuration and the method completes. In this case, the GUI can display a status indicator that shows that authentication is not being used. The error message being displayed (block 307) can direct a user to the status indicator. A user can select the status indicator to trigger the GUI to display a client authentication control interface that allows the user to change the client authentication configuration, such as allowing the user to select a certificate to establish an authenticated session with the server.

If client authentication is not required by the server (block 305), a GUI displays the data that the client requested access to block 309. The data can be displayed using an unauthenticated session between the server and the client. The method continues to block 313 where the GUI shows the authentication configuration and the method completes. In this case, the GUI can display a status indicator that shows that authentication is not being used. The GUI can further enable a user to change the client authentication configuration, such as allowing a user to select a certificate to establish an authenticated session with the server.

If the client authentication system determines there is a configuration stored in memory that matches the server name and port number in the request (block 303), the method responds to the request at block 311 based on the stored configuration. The client authentication system can identify a certificate in the stored configuration that corresponds to the server host name and port number in the request. The identified certificate is a certificate that was used to respond to a previous request having the same server host name and port number. The client authentication system can automatically respond to the request using the identified certificate.

At block 313, the client authentication system displays a GUI that shows the authentication configuration and the method completes. In this case, the GUI can display a status indicator that shows that authentication is being used. The GUI can further enable a user to change the client authentication configuration, such as allowing a user to select a different certificate to establish an authenticated session with the server or to select that client authentication no longer be used.

Figure 4:
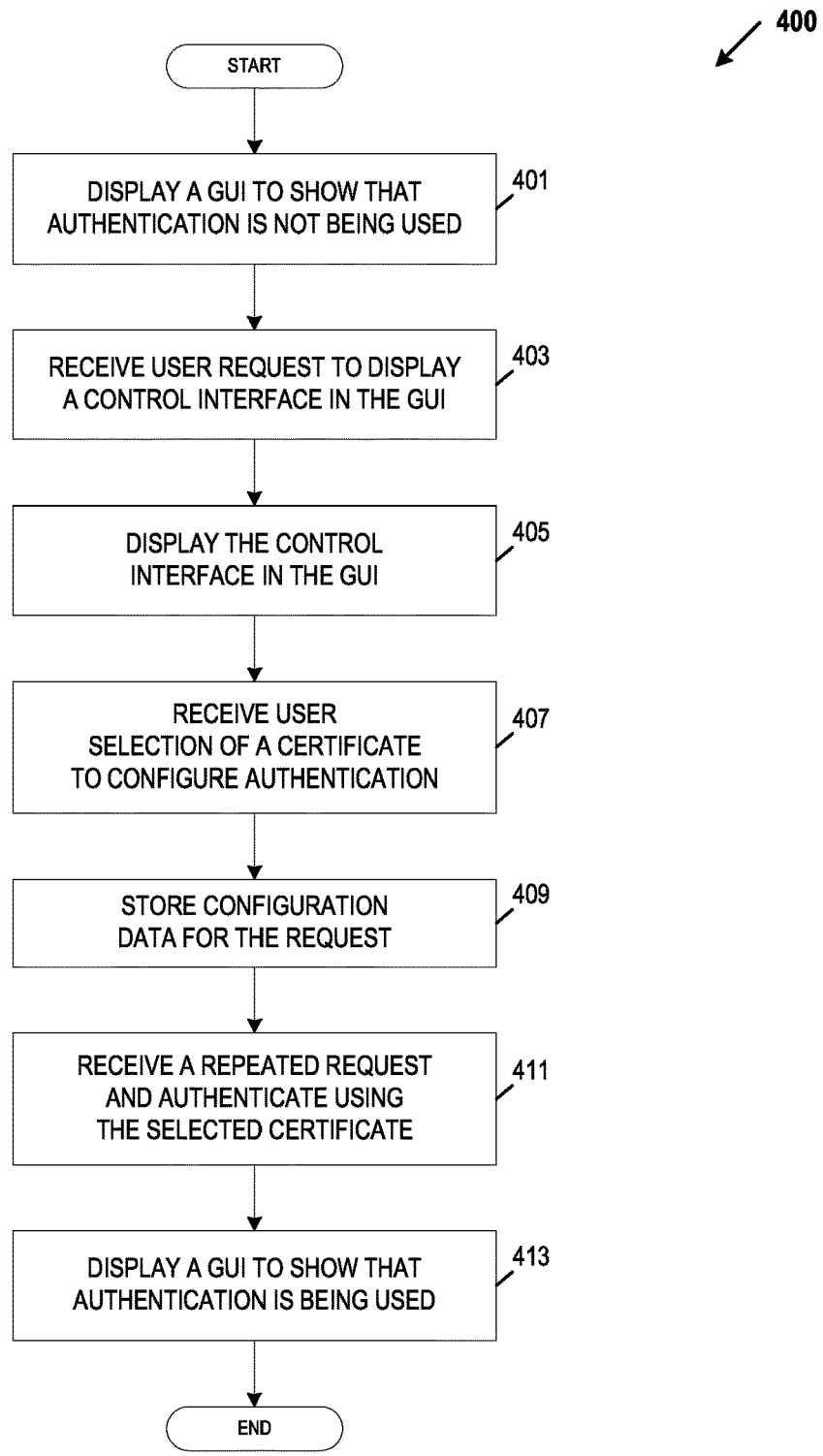
FIG. 4 is a flow diagram which illustrates an embodiment of a method for providing a user control to change a client authentication configuration and for providing visual feedback of the client authentication configuration.

FIG. 4 is a flow diagram which illustrates an embodiment of a method 400 for providing a user control to change a client authentication configuration and for providing visual feedback of the client authentication configuration. Method 400 can be performed by processing logic that can comprise hardware (e.g., circuitry, dedicated logic, programmable logic, microcode, etc.), software (e.g., instructions run on a processing device), or a combination thereof. In one embodiment, method 400 is performed by the client authentication system 160 in a client machine 103 of FIG. 1.

In one embodiment, the method 400 can be initiated upon receiving an authentication request from a server and a client authentication system determining that client authentication is not being used in response to the request. The client authentication system displays a GUI that includes a status indicator that shows that authentication is not being used at block 401. The status indicator can enable a user to change the client authentication configuration, such as allowing a user to select a certificate to establish an authenticated session with the server. At block 403, the client authentication system receives a user request to display a client authentication control interface. For example, a user can activate the status indicator using a selection device (e.g., mouse) to display a control interface. In another example, the GUI can display a list of servers and a user can click on a server to display the control interface.

At block 405, the client authentication system displays the control interface. At block 407, the client authentication system receives a user's selection of a certificate to use in response to the authentication request via the control interface. At block 409, the client authentication system stores the authentication configuration (e.g., the certificate identifier for the certificate used to respond to a request, data indicating where a certificate is stored, such as on a smart card, the name of the CA server that issued the certificate, the expiration date of the certificate, etc.). At block 411, the client authentication system may repeat an earlier request in order to get access to restricted content that requires authentication. For example, a web page may be reloaded which repeats an earlier request and the client authentication system can authenticate using the selected certificate when processing the repeated request. At block 413, the GUI displays the authentication configuration and the method completes. For example, the GUI can replace the status indicator that showed authentication was not being used (from block 401) with a status indicator that shows that authentication is being used. In another example, where there is more than one authentication request, the GUI can add a status indicator that shows that authentication is being used.

Figure 5A:
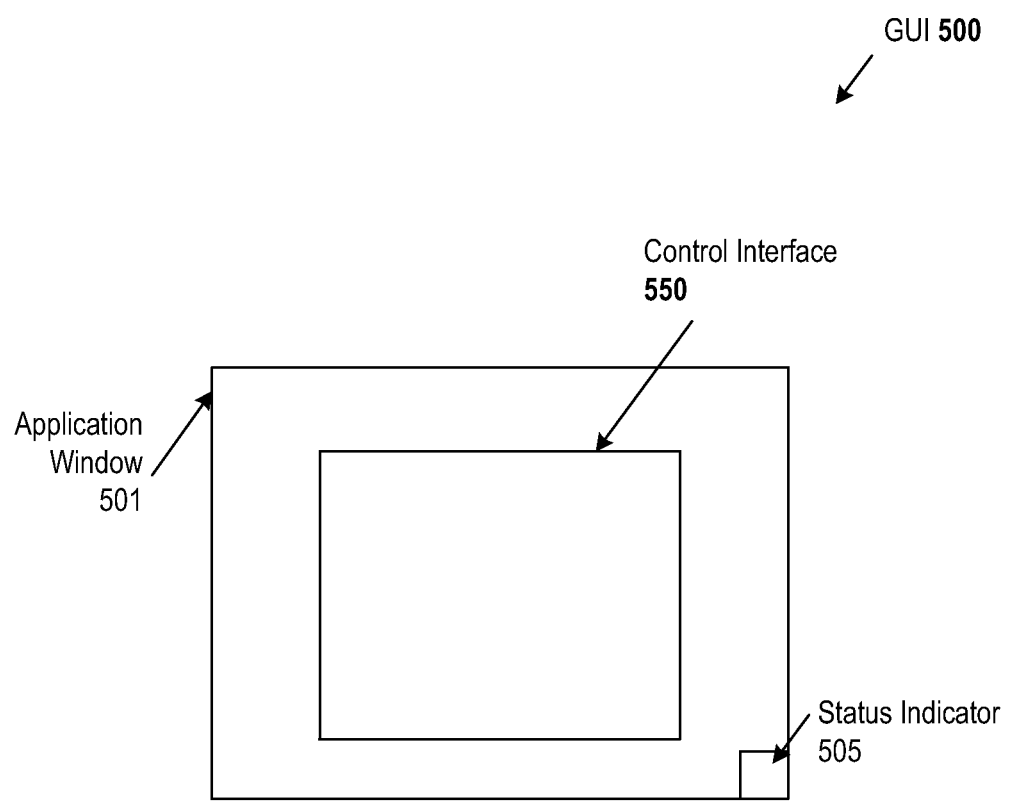
FIGS. 5A-5B illustrates an exemplary graphical user interfaces (GUIs) and components of the GUIs for providing a user control to change an authentication configuration, in accordance with one embodiment of the invention.

FIG. 5A illustrates an exemplary GUI 500 and components of the GUI 500 for providing a user control to change an authentication configuration, in accordance with one embodiment of the invention. A status indicator 505 can be displayed in an application window 501 to show that client authentication is being used or is not being used. The status indicator can be an icon. In other embodiments, the status indicator can be another visual indicator (e.g., text box, image, etc.) to indicate whether or not client authentication is being used. A user can select the status indicator 505 to trigger display of a client authentication control interface 550. For example, a user can activate the status indicator with a mouse to display the control interface 550 as a dialog box.

Figure 5B:
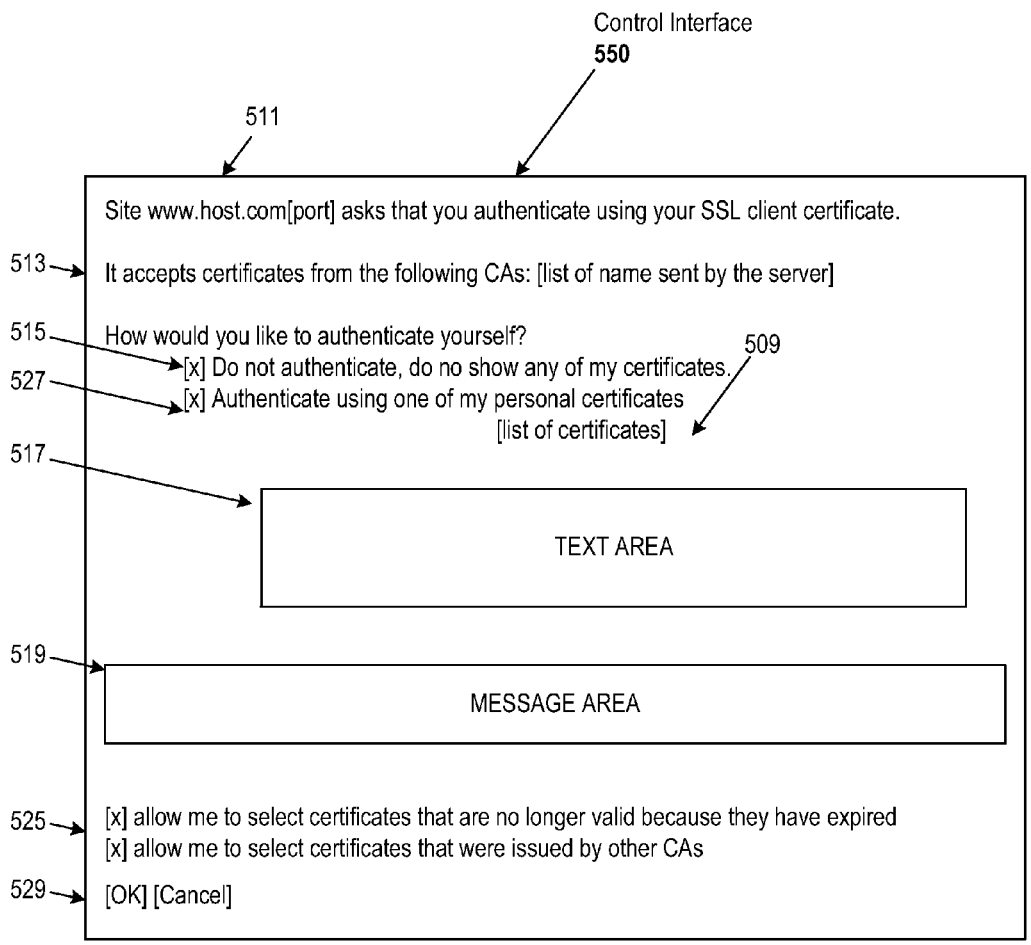

FIG. 5B illustrates an exemplary control interface 550 and components of the control interface 550 for providing a user control to change an authentication configuration, in accordance with one embodiment of the invention. The control interface 550 may include confirmation selection elements 529 (e.g., "OK" and "Cancel") that enable a user to confirm or to not confirm any changes made to the configuration using the control interface 550. The control interface 550 can include the host name 511 of the server that is requesting client authentication and a port number 525 that the server is using to send the request. In some embodiments, if the port number is the standard Secure Sockets Layer (SSL) port for https (port 443), the port number is hidden.

The control interface 550 may include a list of certificate authorities 513 that the server accepts certificates from, if the information is available (e.g., included in the request received from the server). The control interface 550 can also include selection options for certificate user preferences 525. User preferences 525 can indicate whether a user prefers to use certificates to respond to a request which may not meet the requirements of the server. For example, a user may want to use a certificate that was issued by a certificate authority which is not trusted by the server or a user may want to use certificates which have expired.

The control interface 550 can include a selection box for the client to not use client authentication 515 and a selection box for the client to use one of the user's certificates 527 to respond to the server's authentication request. For example, a user can select to use a different certificate for authentication or a user can select "Do not authenticate, do not show any of my certificates" in the control interface. If a user selects to not use client authentication, a client can send a 'no certificate' message to the server.

The control interface 550 can include a list of user certificates 509, for example, in a drop-down menu. In other embodiments, the control interface 550 may include other selection menus (e.g., list box, selection button, etc.) to list the user certificates. The contents of the list 509 can depend on the user preferences 525. The list of certificates can include certificates that are issued by certificate authorities that are trusted by the server. For example, a client may request access to a web page that is a U.S. Government web page and the server that hosts the U.S. Government web page may only accept certificates that are issued by a U.S. Government certificate authority. The control interface 550 may display two user certificates that were provided by U.S. Government certificate authorities in the drop-down menu 509, one from the Federal Bureau of Investigation (FBI) and one from the Internal Revenue Service (IRS).

The control interface 550 can include text in a text area 517 pertaining to the certificate that is currently being selected for authentication. Examples of data that can be included in the text area 517 are the certificate identifier, the name of the issuing certificate authority, the subject name of the certificate, the certified use for the certificate, the name of the storage device storing the certificate (e.g., smart card), etc. The control interface 550 can also include a message in a message area 519 pertaining to the availability of a user's certificate. Examples of messages that can be displayed in the message area 519 include a message that the user does not own a certificate which is issued by a CA that is trusted by the server, a message that the certificate selected by the user is not available because it is either deleted or a smart card is removed from the client, etc.

Figure 6:
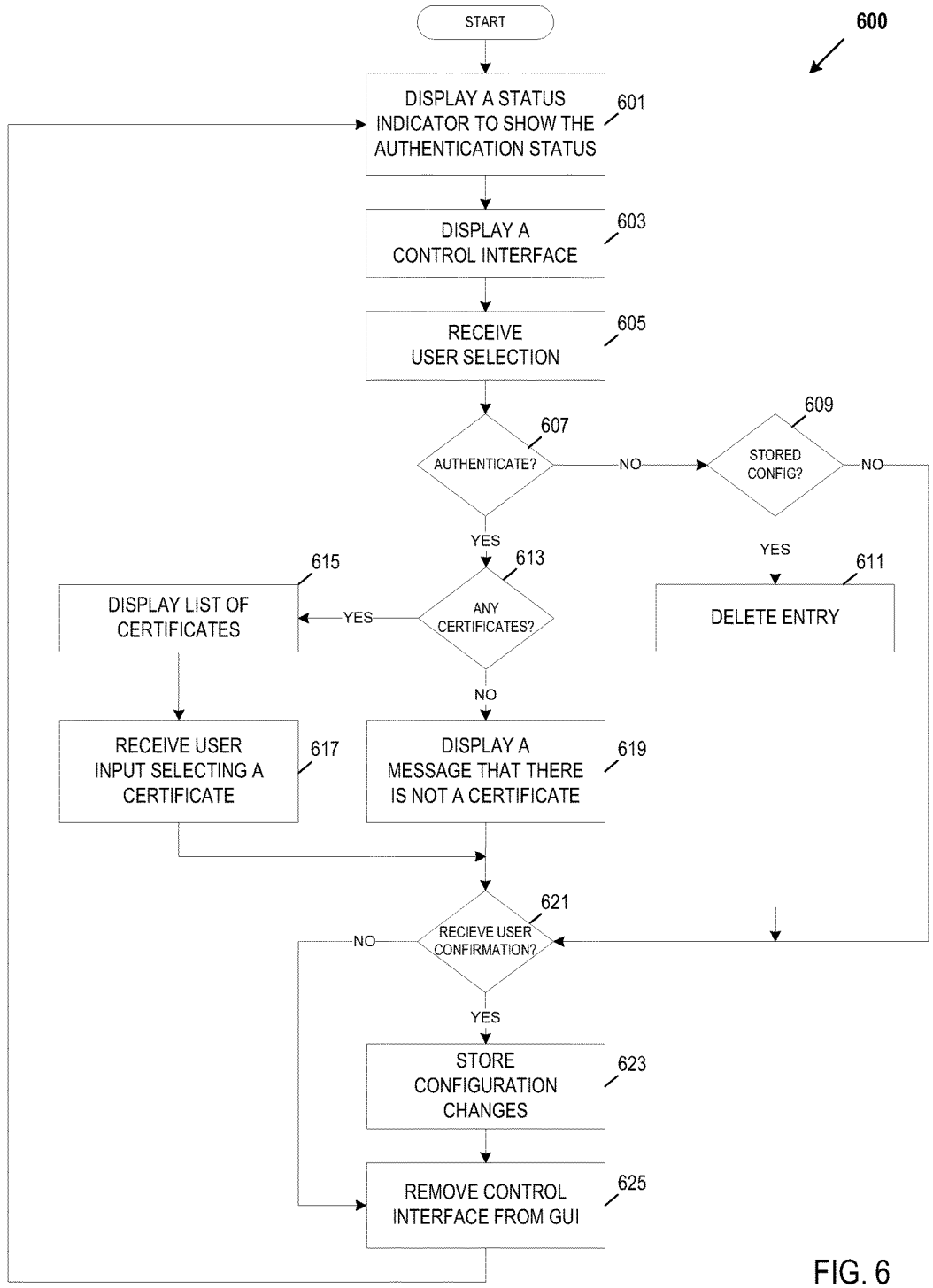
FIG. 6 is a flow diagram which illustrates an embodiment of a method for providing a user control to change a client authentication configuration and for providing visual feedback of the client authentication configuration.

FIG. 6 is a flow diagram which illustrates an embodiment of a method 600 for providing a user control to change a client authentication configuration and for providing visual feedback of the client authentication configuration. Method 600 can be performed by processing logic that can comprise hardware (e.g., circuitry, dedicated logic, programmable logic, microcode, etc.), software (e.g., instructions run on a processing device), or a combination thereof. In one embodiment, method 600 is performed by the client authentication system 160 in a client machine 103 of FIG. 1.

In one embodiment, the method 600 can be initiated upon the client authentication system displaying a GUI that includes a status indicator showing the authentication status. The GUI can display a status indicator that shows that authentication is being used and/or a status indicator that shows that authentication is not being used. At block 603, the client authentication system receives a user request to display an authentication control interface and displays a GUI that includes a client authentication control interface (e.g., control interface 550 in FIG. 5). The control interface can include a selection box to not use client authentication and a selection box to use one of the user's certificates for client authentication. At block 605, the client authentication system receives a user's selection and determines whether a user selected to use client authentication at block 607. If client authentication will not be used (block 607), the client authentication system determines whether there is a configuration stored in memory that corresponds to the authentication request at block 609. If there is not a stored configuration, the method continues to block 621. If there is a stored configuration, the client authentication system deletes the entry at block 611 and the method continues to block 621.

If the client authentication will be used (block 607), the client authentication system determines whether the user has any user certificates that meet the server's requirements at block 613. The client authentication system can search authentication configuration data maintained in a persistent storage unit for any user certificates that are issued by CAs that are trusted by the server. If there are no certificates that meet the server's requirements (block 613), the GUI displays a message in the control interface indicating that a user does not own a certificate which is issued by a CA that is trusted by the server at block 619. A user can subsequently obtain a certificate issued by a CA that is trusted by the server and the client authentication system can subsequently include the certificate in the list the certificates in the control interface.

If the client determines that there is a certificate that meets the server requirements (block 613), the GUI can display a list of certificates in the control interface at block 615. The client authentication system can also list the certificates based on the user preferences stored in a persistent storage unit. For example, the user preferences can allow the GUI to display expired certificates and certificates that do not meet a server's requirements. At block 617, the client authentication system receives a user's selection of a certificate from the list to use for authentication.

At block 621, the client authentication system determines whether a user confirms the selections made (e.g., to use the selected certificate from block 617 or to not use client authentication at block 607). The control interface can include selection elements (e.g., "OK" button or "Cancel" button) that enable a user to confirm or to not confirm any changes made using the control interface. If the client authentication system does not receive confirmation of the selection (e.g., a user selects "Cancel"), selections made by a user are not stored and the method continues to block 625.

If the client authentication system receives confirmation of the selection (e.g., a user selects "OK"), the client authentication system can store the configuration changes at block 623. For example, if at block 617, the selected certificate is a certificate that is different than a certificate stored in the configuration data for this particular server and port number, the client authentication system can delete the stored entry and store the server data and certificate data pertaining to selection of the different certificate that was received at block 617. In another example, if a user selected to not use authentication (block 607) and/or an entry is deleted (block 611), the client authentication system can store data reflecting these changes. At block 625, the GUI can remove the display of the control interface and the method returns to block 601 to show the authentication status and the method completes. The client authentication system can remember the new selections for future connections to the same server and port number. The client authentication system may use the new selections by receiving a repeat of an earlier request. For example, if a web page is reloaded after the changes have been stored, the client authentication system can display a status indicator in the GUI showing whether or not authentication is being used based on the new configuration.

Figure 7:
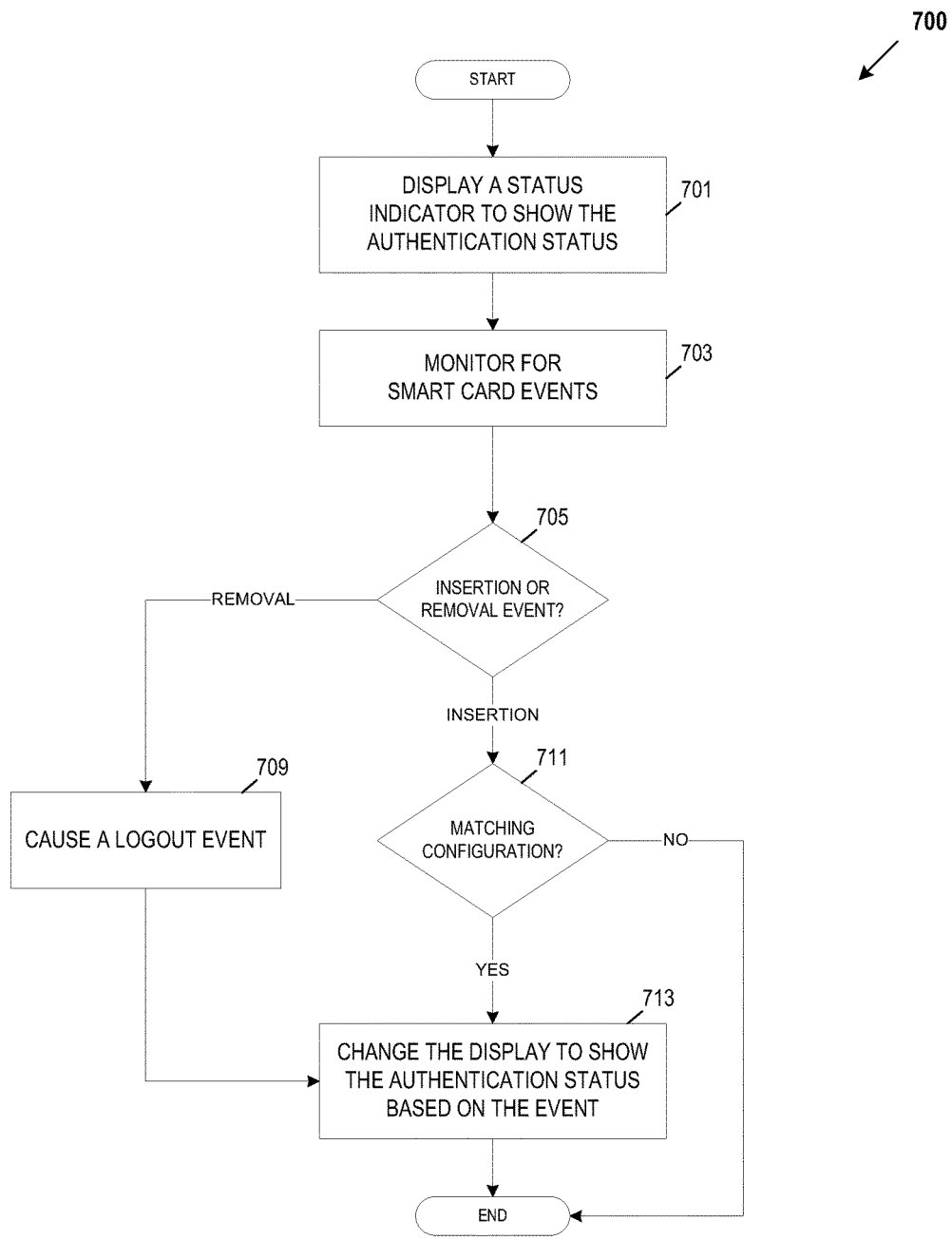
FIG. 7 is a flow diagram which illustrates an embodiment of a method for automatically configuring client authentications and for providing visual feedback of the client authentication configuration.

FIG. 7 is a flow diagram which illustrates an embodiment of a method 700 for automatically configuring client authentications and for providing visual feedback of the client authentication configuration. Method 700 can be performed by processing logic that can comprise hardware (e.g., circuitry, dedicated logic, programmable logic, microcode, etc.), software (e.g., instructions run on a processing device), or a combination thereof. In one embodiment, method 700 is performed by the client authentication system 160 in a client machine 103 of FIG. 1.

In one embodiment, the method 700 can be initiated upon receiving an authentication request from a particular server and port number, and determining that client authentication is not being used in response to the request. For example, a user can store a digital certificate on a smart card, but may not have inserted the smart card in a smart card reader on the client device when the client authentication system received an authentication request from a server. The client authentication system displays a GUI that includes a status indicator showing that authentication is not being used at block 701. In another example, a user can store a digital certificate on a smart card, and tion request from a server and the client authentication system displays a status indiclient authentication system received an authentication request from a server. The client authentication system displays a GUI that includes a status indicator showing that authentication is being used at block 701.

At block 703, the client authentication system monitors system events for events pertaining to portable storage devices (e.g., smart cards). For example, a user can insert or remove a smart card from a smart card reader in the client device and the client authentication system will receive an insertion event or a removal event accordingly.

At block 705, the client authentication system receives an event and determines whether the event is an insertion event or removal event. If a removal event is received (block 705), the client authentication system can cause a logout event for the active SSL session and clear a session identifier (e.g., invalidate a session ID) at block 709. At block 713, the GUI can change to display a status indicator showing the authentication configuration based on the received event. For example, a user may have initially inserted the smart card when the client authentication system received an authentication request from a server and the client authentication system displays a GUI that includes a status indicator showing that authentication is being used at block 701. Subsequently, the user removes the smart card and the client authentication system receives a removal event. At block 713, the GUI is changed to display a status indicator showing that authentication is now not being used.

If an insertion event is received (block 705), the client authentication system can determine whether the certificate on the inserted smart card matches a configuration stored in the persistent storage unit for this particular server and port number. If the certificate does not match the stored configuration, the method ends. If the certificate matches the stored configuration (block 711), the GUI displays a status indicator to show that client authentication is being used at block 713 and the method completes. For example, a user may not have initially inserted the smart card when the client authentication system received an authentication request from a server and the client authentication system displays a status indicator showing that authentication is not being used at block 701. Subsequently, the user inserts the smart card having a matching certificate and the client authentication system receives an insertion event. At block 713, the GUI is changed to display a status indicator showing that authentication is now being used.

Figure 8:
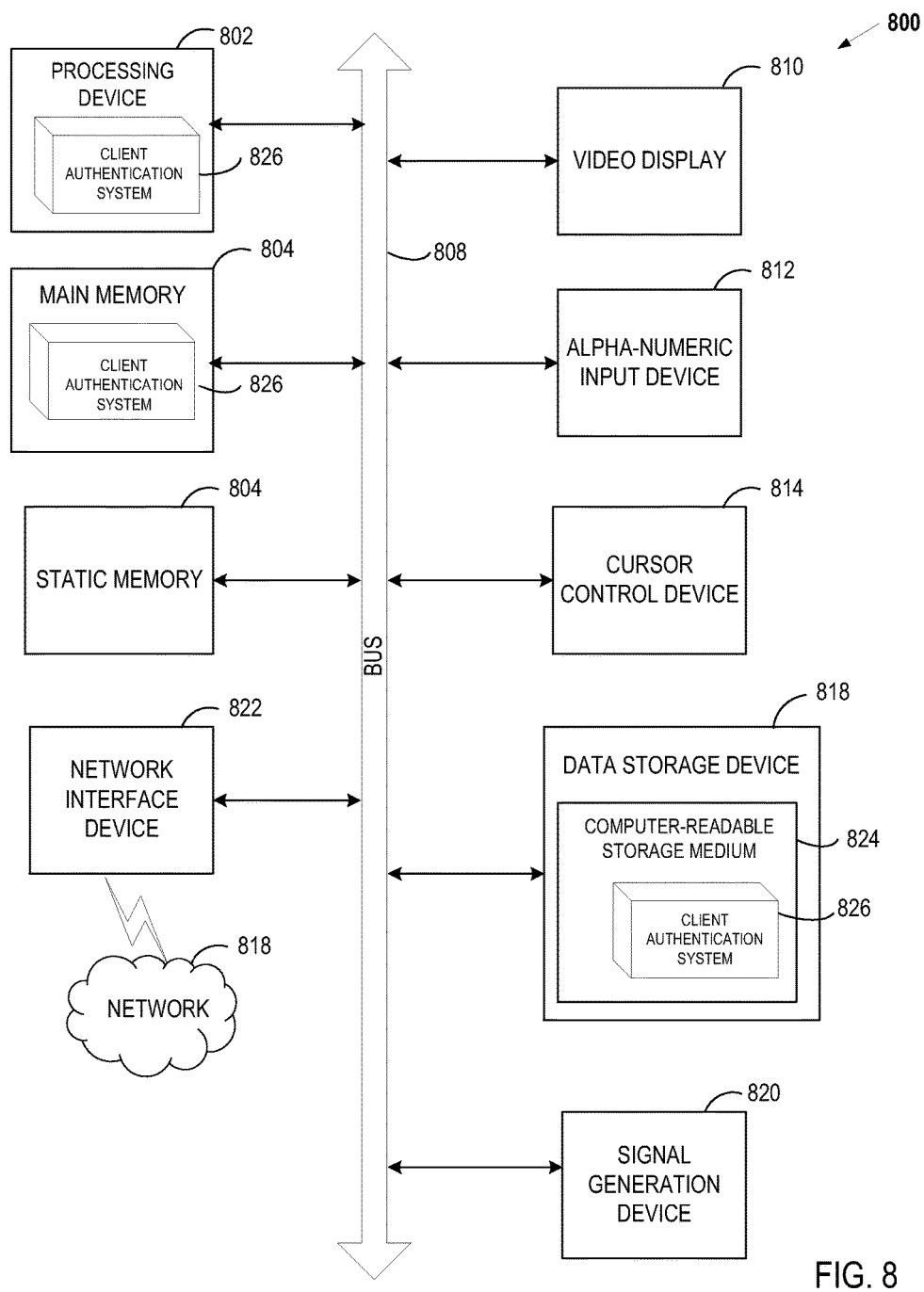
FIG. 8 is a diagram of one embodiment of the client authentication system.

FIG. 8 is a diagram of one embodiment of a computer system for controlling client authentication and providing visual feedback of the client authentication. Within the computer system 800 is a set of instructions for causing the machine to perform any one or more of the methodologies discussed herein. In alternative embodiments, the machine may be connected (e.g., networked) to other machines in a LAN, an intranet, an extranet, or the Internet. The machine can operate in the capacity of a server or a client machine (e.g., a client computer executing the browser and the server computer executing the automated task delegation and project management) in a client-server network environment, or as a peer machine in a peer-to-peer (or distributed) network environment. The machine may be a personal computer (PC), a tablet PC, a console device or set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 800 includes a processing device 802, a main memory 804 (e.g., read-only memory (ROM), flash memory, dynamic random access memory (DRAM) such as synchronous DRAM (SDRAM) or DRAM (RDRAM), etc.), a static memory 806 (e.g., flash memory, static random access memory (SRAM), etc.), and a secondary memory 816 (e.g., a data storage device in the form of a drive unit, which may include fixed or removable computer-readable storage medium), which communicate with each other via a bus 808.

Processing device 802 represents one or more general-purpose processing devices such as a microprocessor, central processing unit, or the like. More particularly, the processing device 802 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. Processing device 802 is configured to execute the client authentication system 826 for performing the operations and steps discussed herein.

The computer system 800 may further include a network interface device 822. The computer system 800 also may include a video display unit 810 (e.g., a liquid crystal display (LCD) or a cathode ray tube (CRT)) connected to the computer system through a graphics port and graphics chipset, an alphanumeric input device 812 (e.g., a keyboard), a cursor control device 814 (e.g., a mouse), and a signal generation device 820 (e.g., a speaker).

The secondary memory 816 may include a machine-readable storage medium (or more specifically a computer-readable storage medium) 824 on which is stored one or more sets of instructions (e.g., the client authentication system 826) embodying any one or more of the methodologies or functions described herein. The client authentication system 826 may also reside, completely or at least partially, within the main memory 804 and/or within the processing device 802 during execution thereof by the computer system 800, the main memory 804 and the processing device 802 also constituting machine-readable storage media. The a client authentication system 826 may further be transmitted or received over a network 818 via the network interface device 822.

The computer-readable storage medium 824 may also be used to store the client authentication system 826 persistently. While the computer-readable storage medium 824 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

The client authentication system 826, components and other features described herein (for example in relation to FIG. 1) can be implemented as discrete hardware components or integrated in the functionality of hardware components such as ASICS, FPGAs, DSPs or similar devices. In addition, the client authentication system 826 can be implemented as firmware or functional circuitry within hardware devices. Further, the client authentication system 826 can be implemented in any combination hardware devices and software components.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed description which follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving," "determining," "displaying," "storing," "maintaining," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus can be specially constructed for the required purposes, or it can comprise a general purpose computer system specifically programmed by a computer program stored in the computer system. Such a computer program can be stored in a computer-readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems can be used with programs in accordance with the teachings herein, or it may prove convenient to construct a more specialized apparatus to perform the method steps. The structure for a variety of these systems will appear from the description below. In addition, embodiments of the present invention are not described with reference to any particular programming language. It will be appreciated that a variety of programming languages can be used to implement the teachings of embodiments of the invention as described herein.

A computer-readable storage medium can include any mechanism for storing information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only memory (EPROM), Electrically Erasable Programmable Read-Only Memory (EEPROM), magnetic or optical cards, flash memory, or the like.

Thus, a method and apparatus for controlling client authentication and providing visual feedback of client authentication has been described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method, comprising:
receiving, by a processing device of a client computing system, a plurality of client authentication requests associated with a web page in response to the client computing system requesting access to the web page;
determining, by the processing device, whether a storage device contains configurations for the plurality of authentication requests;
configuring, by the processing device, client authentication for the plurality of client authentication requests in view of whether the storage device comprises the configurations for the plurality of authentication requests;
presenting, in a graphical user interface (GUI), client authentication configuration status for the plurality of authentication requests;
providing, via the GUI, control to change the client authentication configuration for at least one of the plurality of authentication requests; and
accessing client authentication configuration data of a removable storage unit, wherein determining whether the storage device contains the configurations further comprises comparing the configurations for the plurality of authentication requests to the client authentication configuration data.

2. The method of claim 1, wherein the plurality of client authentication requests comprise at least two requests that are each from a different server.

3. The method of claim 1, wherein the plurality of client authentication requests comprise at least two requests that are each from different ports on a same server.

4. The method of claim 1, further comprising presenting in the GUI a list of server names corresponding to at least one of the plurality of authentication requests.

5. The method of claim 1, wherein providing control further comprising:
receiving input to present a control interface in the GUI;
presenting certificate data in the control interface, wherein the certificate data comprises a list of certificates corresponding to at least one of the plurality of authentication requests; and
receiving a selection to change the authentication configuration for the web page, wherein the change comprises one of selecting a certificate for the authentication configuration, changing a certificate for the authentication configuration, or selecting no certificate for the authentication configuration.

6. A system comprising:
a persistent storage unit to store client authentication configuration data for a user;
a processing device of a client operatively coupled to the persistent storage unit, the processing device to:
receive a plurality of client authentication requests associated with a web page in response to the client requesting access to the web page;
determine whether the storage unit comprises configurations for the plurality of authentication requests;
configure client authentication for the plurality of client authentication requests in view of whether the storage unit comprises the configurations for the plurality of authentication requests;
present, in a graphical user interface (GUI), a client authentication configuration status for the plurality of authentication requests;
provide, via the GUI, control to change the client authentication configuration for at least one of the plurality of authentication requests; and
access client authentication configuration data of a removable storage unit, and wherein, to determine whether the persistent storage unit comprises the configurations for the plurality of authentication requests, the processing device is further to compare the configurations for the plurality of authentication requests to the client authentication configuration data.

7. The system of claim 6, wherein the plurality of client authentication requests comprise at least two requests that are each from a different server.

8. The system of claim 6, wherein the plurality of client authentication requests comprise at least two requests that are each from different ports on a same server.

9. The system of claim 6, wherein the GUI is further to display at least one of: a server name a port number for a corresponding authentication request.

10. The system of claim 6, wherein the processing device is further to present in the GUI a list of server names corresponding to at least one of the plurality of authentication requests.

11. The system of claim 6, wherein to provide control, the processing device further to:
- receive input to present a control interface in the GUI;
- present certificate data in the control interface, wherein the certificate data comprises a list of certificates that correspond to at least one of the plurality of authentication requests; and
- receive a selection to change the authentication configuration for the web page, wherein the change comprises one of selecting a certificate for the authentication configuration, changing a certificate for the authentication configuration, or selecting no certificate for the authentication configuration.

12. A non-transitory computer-readable storage medium comprising instructions that, when executed by a processing device of a client computing system, cause the processing device to:
- receive, by the processing device, a plurality of client authentication requests associated with a web page in response to the client computing system requesting access to the web page;
- determine, by the processing device, whether a storage device comprises configurations for the plurality of authentication requests;
- configure, by the processing device, client authentication for the plurality of client authentication requests in view of whether the storage device comprises the configurations for the plurality of authentication requests;
- present, in a graphical user interface (GUI), a client authentication configuration status indicators for the plurality of authentication requests;
- provide, via the GUI, control to change a certificate being used for the client authentication configuration associated with at least one of the plurality of authentication requests; and
- access client authentication configuration data of a removable storage unit, and wherein, to determine whether the storage device comprises the configurations for the plurality of authentication requests, the processing device is further to compare the configurations for the plurality of authentication requests to the client authentication configuration data.

13. The non-transitory computer-readable storage medium of claim 12, wherein the plurality of client authentication requests comprise at least two requests that are each from a different server.

14. The non-transitory computer-readable storage medium of claim 12, wherein the plurality of client authentication requests comprise at least two requests that are each from different ports on a same server.

15. The non-transitory computer-readable storage medium of claim 12, wherein the GUI is further to display at least one of: a server name a port number for a corresponding authentication request.

16. The non-transitory computer-readable storage medium of claim 12, wherein the processing device is further to present in the GUI a list of server names corresponding to at least one of the plurality of authentication requests.

17. The non-transitory computer-readable storage medium of claim 12, the processing device further to:
- receive input to present a control interface in the GUI;
- present certificate data in the control interface, wherein the certificate data comprises a list of certificates that correspond to at least one of the plurality of authentication requests; and
- receive a selection to change the authentication configuration for the web page, wherein the change comprises one of selecting a certificate for the authentication configuration, changing a certificate for the authentication configuration, or selecting no certificate for the authentication configuration.

\* \* \* \* \*